INVENTORS
FRED M. MAYES &
JACK WEIR JONES
BY
ATTORNEYS

Jan. 4, 1966     F. M. MAYES ETAL     3,227,945
BORE HOLE LOGGING APPARATUS INCLUDING MEANS FOR PRODUCING
A PULSE TIME MODULATED LINEAR RECORD
Filed June 4, 1959     6 Sheets-Sheet 6

*INVENTORS*
FRED M. MAYES &
JACK WEIR JONES
BY
ATTORNEYS

United States Patent Office 3,227,945
Patented Jan. 4, 1966

3,227,945
BORE HOLE LOGGING APPARATUS INCLUDING MEANS FOR PRODUCING A PULSE TIME MODULATED LINEAR RECORD
Fred M. Mayes and Jack Weir Jones, Richardson, Tex., assignors to Sun Oil Company, Philadelphia, Pa., a corporation of New Jersey
Filed June 4, 1959, Ser. No. 818,066
3 Claims. (Cl. 324—1)

This invention relates to bore hole logging apparatus and particularly to apparatus involving the location of recording apparatus within a hole.

Conventional methods of well logging, whether of electrical or other types, involve the absence of the drill stem during the logging operation. This has two serious drawbacks in that not only must special time be consumed in running the well log, during which time the drill stem must be out of the hole, but after a period of drilling, due to the fact that the drill stem must be removed, there is inevitably a delay before the new part of the hole may be logged, during which delay there occurs invasion of the formation by drilling liquid. Since the drilling liquid has physical properties of its own, it may, by penetration of porous layers, greatly change their properties so as to interfere with their detection. For example, in the case of electrical logging, the conductivity of the liquid will effect changes in the apparent conductivity of the formations; and in the case of acoustic logging the absorption and velocity of sound will be changed, etc Proposals have been made to effect electrical logging by using the drill bit or one or more other parts of the drill stem as logging electrodes. In line with this it has been proposed to supply special drill stem tubing containing one or more conductors which are electrically connected in the assembly of the drill stem and extend to recording apparatus at the surface. The use of such an arrangement has been found to be impractical because of high cost and wear.

Proposals have also been made to support one or more electrodes on wire lines to be dropped below a core bit into the lower portion of a hole from which the bit has been raised. This procedure has also proved impractical inasmuch as special handling has been required at the surface, but particularly because core bits are not generally desired for the major drilling activities but are used only for special purposes.

In accordance with our application, Serial No. 683,027, filed September 10, 1957, now Patent 3,065,404, dated November 20, 1962, logging methods and apparatus are provided which may be used when a drill string is in a bore hole and may be used at any time with a minimum of interruption in drilling. Not only may the logging be accomplished just prior to removal of the drill string for the purpose of changing a bit, but the logging may be carried out to be promptly followed by a continuation of drilling. In accordance with said patent a self-contained energizing and recording apparatus may be dropped through a drill string in go-devil fashion or may be pumped down therethrough when the drill string has been lifted to only a limited extent from the bottom of the hole to provide a region for reception of an electrode or other logging assembly. The apparatus particularly includes an assembly of a type suitable to pass through the mud flow openings of a jet bit which may be of any of the conventional popular types. Such bits are presently widely used since they effect the carrying away of cuttings and avoid their reworking by the drill. These jet openings are generally at relatively small angles with respect to the drill stem axis, and a flexible assembly may, accordingly, be projected therethrough to extend beneath the bit.

The self-contined assembly lowered to the vicinity of the bit contains, for electrical logging, not only means for supplying current to the earth, but also means for recording various potentials at the electrodes of the assembly.

Recording in a self-contained instrument within a drill stem within a bore hole has always presented substantial difficulties because of the limited diametral space afforded. Without the possibility of reference to some standard frequency supply line, there is difficulty in providing constant speed of transport of the recording medium. Furthermore, since the apparatus used must be kept to a minimum, stability of measuring circuits is difficult to maintain.

According to the disclosure of said patent, exciting and recording apparatus were provided which were self-contained and sufficiently simple in construction to be housed in apparatus which may pass through a drill stem. A pulse width modulation recording system was used which was essentially independent of supply voltage changes and of the transport speed of the recording medium, specifically, a magnetic tape.

Also avoided in accordance with said disclosure was the difficulty of maintaining a constant current to the current electrode or electrodes. The record was dependent solely on the ratios of potentials to the current introduced into the earth, and, consequently, valid and interpretable results were secured in view of the fact that the electrical configuration presented by the earth is linear.

The general object of the present invention is the provision of improved apparatus similar to that disclosed in our Patent 3,065,404. The objects of the invention may be more easily appreciated from consideration of the following disclosure and, in particular the description of operation, but may generally be said to relate to the securing of more reliable results, the minimizing of drain on a power supply, the production of more significant self-potential measurements resulting from automatic balancing out of constant potentials of no significance, and the like. The present application relates primarily to the electrical circuitry and devices employed but for a complete understanding of the invention there will be described mechanical details which are not herein claimed but which are claimed in other copending applications referred to hereafter, some of which are now patents.

Reference will be made particularly to the accompanying drawings, in which.

Reference will first be made to mechanical aspects of the logging apparatus. As an introduction to the discussion thereof, reference may be made to certain findings with respect to operation of a recording apparatus within a drill stem and involving the projection of an electrode assembly through jet openings of a bit. It was originally assumed that an electrode assembly to be reliably projected through the jet openings of a bit would have to be guided for entrance into the openings, and for this reason there was first adopted a so-called wand assembly having flexibility but a substantial degree of stiffness so that projection could be effected by the guidance of the lower end of the assembly to a jet opening, the assembly then being thrust through the opening by a pushing action on its upper end due to the weight of the recording apparatus and its carrier casing. Subsequently, it was found that special guidance need not be provided, but that such a wand would be very reliably guided into a jet opening by flow of drilling fluid. Due to the fear that complete reliability might not occur because of the possibility that the wand might take an appreciable but short interval of time to enter properly a jet opening, or might thereafter have its descent interrupted for a short period by friction with the wall of a hole below the bit, or by temporary entrance into a pit in the wall, it was considered desirable to slow down the descent of the recording apparatus so that the latter during its fall would not tend to collapse the electrode assembly. Provision of means for retarding the descent of the apparatus as it approached the position in which the electrode assembly would be about to enter a jet opening was found to eliminate the necessity for having the electrode assembly of substantial stiffness, and in accordance with the present disclosure there is provided an apparatus having a highly flexible electrode assembly and which may be briefly described as follows:

The electrode assembly, which may be of quite considerable length, for example, upwards of 20 feet, is constituted by what is little more than a multi-conductor insulated electrical cable provided with localized electrodes most desirably formed as hereafter described in detail. This assembly has the flexible characteristics of an ordinary electrical cable. At its upper end it is mechanically secured to an elongated housing assembly which contains the recording apparatus. This housing assembly is associated with means for retarding the free descent of the entire apparatus. In particular, a type of "parachute" arrangement is used to permit some degree of retardation of dropping of the apparatus through the drill stem, so that the flexible electrode assembly will be certain to remain, during the dropping, substantially fully extended by its own weight and by weighting means carried by its lower end. Then, when the lower end of the electrode assembly approaches the jet openings of a bit further retardation of descent is provided by means cooperating with the usual reduced diameter walls of the bore of a drill collar. The lower end of the flexible wand accordingly approaches the jet openings relatively slowly and is guided by the mud flow reliably through one of the openings and passes downwardly below the bit. Due to its high flexibility and to the use of properly constructed weighting means at its lower end it is extremely unlikely that it will be retarded by irregularities in the wall of the hole, and even if it is temporarily retarded it is free to bend and drop over any shelves or other obstructions which may be encountered.

Consistently with the foregoing, the uppermost end of the assembly comprises a stem 2 which is indicated as threaded at 4 for the reception of a spearhead or other device depending upon the fashion in which operation is to occur. While secured to the threads at 4 there may be a coupling arrangement to secure the assembly to a lowering wire line, the assembly, as disclosed, is particularly intended to be dropped in go-devil fashion through a drill stem, and in such case will ordinarily be surmounted by a conventional spearhead which may be later grasped by an overshot attached to a wire line to remove the assembly. However, in other cases, it may be desired to recover the assembly only through the lifting and dismantling of the drill string, and in such case the threads at 4 may be merely protected by a screw cap.

Secured at 6 to the upper end of the stem 2 and at 8 adjacent to its lower end is a parachute element 10 in the form of a bulb-like structure of flexible wear-resisting rubber desirably provided with a plurality of openings 12 for the entrance and exit of drilling fluid. The member 10 is arranged to be of a diameter desirably normally slightly exceeding that of the major portion of the bore of the drill stem through which it is dropped, and by reason of this fact it acts to slow down the relative velocity of the assembly with respect to the velocity of downflow of the drilling fluid. A tendency of the assembly to drop substantially faster than the drilling fluid will cause the bulb to expand and thus it acts, both by fluid friction and to some extent by mechanical friction with the walls, to slow down the descent. It will, of course, be understood that during the lowering the rate of descent may be controlled to a considerable extent by the rate at which the fluid is pumped downwardly. A coupling 14 connects the stem 2 to a mounting body 16 which is provided with longitudinal slots 18 for the slidable reception of elongated shoes 20 which may move radially inwardly and outwardly, being urged outwardly by springs 22 distributed along their length as indicated, outward movement being limited by retaining collars 24 and 26. The outer diameter to which the shoes 20 may move is so restricted that it is less than the internal diameter of the drill stem but greater than the smaller internal diameter of the drill collar. Thus, during the major portion of the descent and until the shoes enter the drill collar they perform no function in effectual retarding of the descent of the assembly. As will have been gathered from what has been previously stated, the arrangement is such that the shoes enter the drill collar shortly before the lower end of the electrode assembly reaches the position of entrance to a jet opening of a bit.

A coupling 30 connects the member 16 to a spindle 32 which, like the spindle 2, serves to mount a rubber parachute at its upper and lower ends as indicated at 36 and 38. The parachute 34 may be the same as that previously described, but is illustrated as involving in its lower portion elongated openings 40 which tend to promote the parachute action. As in the case of the upper parachute, this also serves to slow down the rate of descent relative to that of the drilling fluid by both fluid resistance action and contact with the walls of the drill stem. Both parachutes are, of course, free to collapse further as they enter the reduced bore of a drill collar. The parachutes may be of different diameters if the diameter of the drill pipe is tapered or made up of sections of different diameters as is sometimes the case.

Because of the great length of the entire assembly, it is desirable to provide a universal joint as indicated at 42 to permit the top portion of the assembly to be folded for transportation relative to the lower portion. The universal joint comprises elements which, as will be evident from the drawing, serve for folding about axes 44 and 46 which are at right angles to each other. The lower end of the universal joint is threaded at 48 for attachment to an upper plug 50 of the instrument housing.

The plug 50 has a reduced portion 52 engageable within the upper end of a tube 54 which is broken away in the drawings but which is of considerable length to house the electrical apparatus which will be later described. This latter apparatus must be protected against influx of the drilling fluid, very high pressures being encountered in deep holes. A special construction is accordingly here adopted as follows:

An O-ring 60 is located in an annular groove 58 in the portion 52 of the plug. Adjacent to the location of this O-ring the walls of the tube 54 are reduced in outside diameter as indicated at 62, providing a flexible tubular portion which by reason of external pressures is susceptible to being compressed radially to engage tightly the exterior of the plug portion 52. This arrangement is adopted to prevent any extrusion of the O-ring 60 into the clearance, required for assembly, between the cylindrical outside surface of the plug portion 52 and the inner cylindrical surface of tube 54. Even though the normal clearance may be very slight, at the great pressures encountered in a bore hole such extrusion and destruction of an O-ring may occur, and it is therefore, desirable to eliminate this clearance entirely when high pressure is applied, by the use of the construction described.

In order to secure the plug and tube 54 together it is desirable to provide in bores 64 the plug members 66 which have stems threaded into a threaded bore 68 in the plug in axial alignment with the bores 64. These plugs have tapered outer ends arranged to be received within the tapered inner ends of openings 70 in the tube 54. By turning them so that they move outwardly a tight engagement is secured without any projection of elements beyond the outer diameter of the tube 54.

The lower end of the tube 54 is closed by a plug 72 which, like the one previously discussed, is provided with an O-ring 78 adjacent to which the tube 54 is relatively thin so as to be collapsible inwardly radially for tight engagement with the plug to prevent extrusion of the O-ring. In the case of the lower plug, securing means is provided at 74 as previously described and as shown particularly in FIGURE 7. The pressure resisting closure means just described is the subject matter of the patent to Preston E. Chaney, Number 3,074,589, dated January 22, 1963.

A bore 80 extends through the lower plug 72 to pass insulated conductors extending from the electrodes. These are tightly packed through this bore to withstand external pressures.

Figure 1:
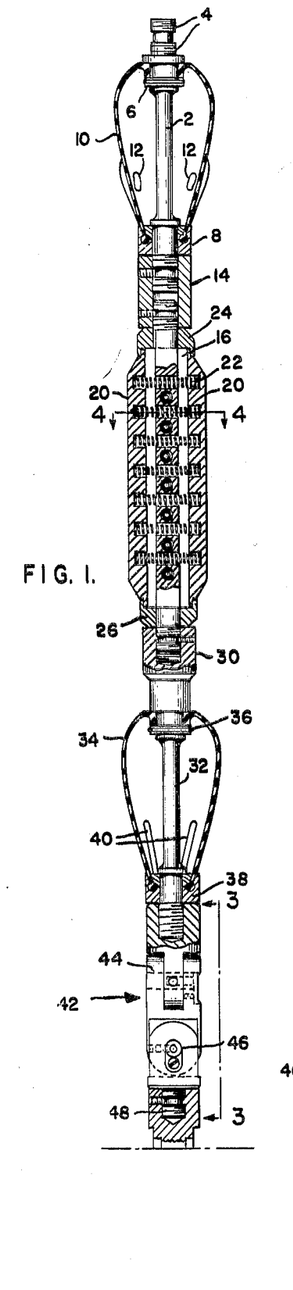
FIGURE 1 is a vertical section taken through the upper portion of a logging apparatus provided in accordance with the invention.
Figures 2, 3, 4:
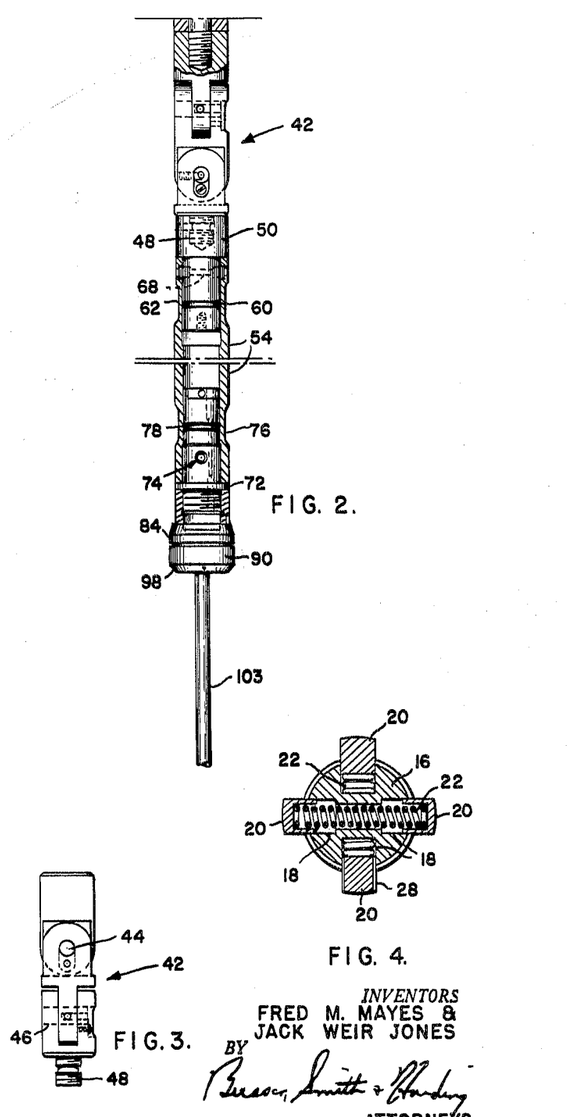
FIGURE 2 is a similar section showing a lower portion thereof.
FIGURE 3 is an elevation looking at the right of the lower portion of FIGURE 1 in the region indicated at 3—3 therein.
FIGURE 4 is a transverse section of the apparatus taken on the plane indicated at 4—4 in FIGURE 1.
Figures 5, 6A, 6B, 7, 8, 9:
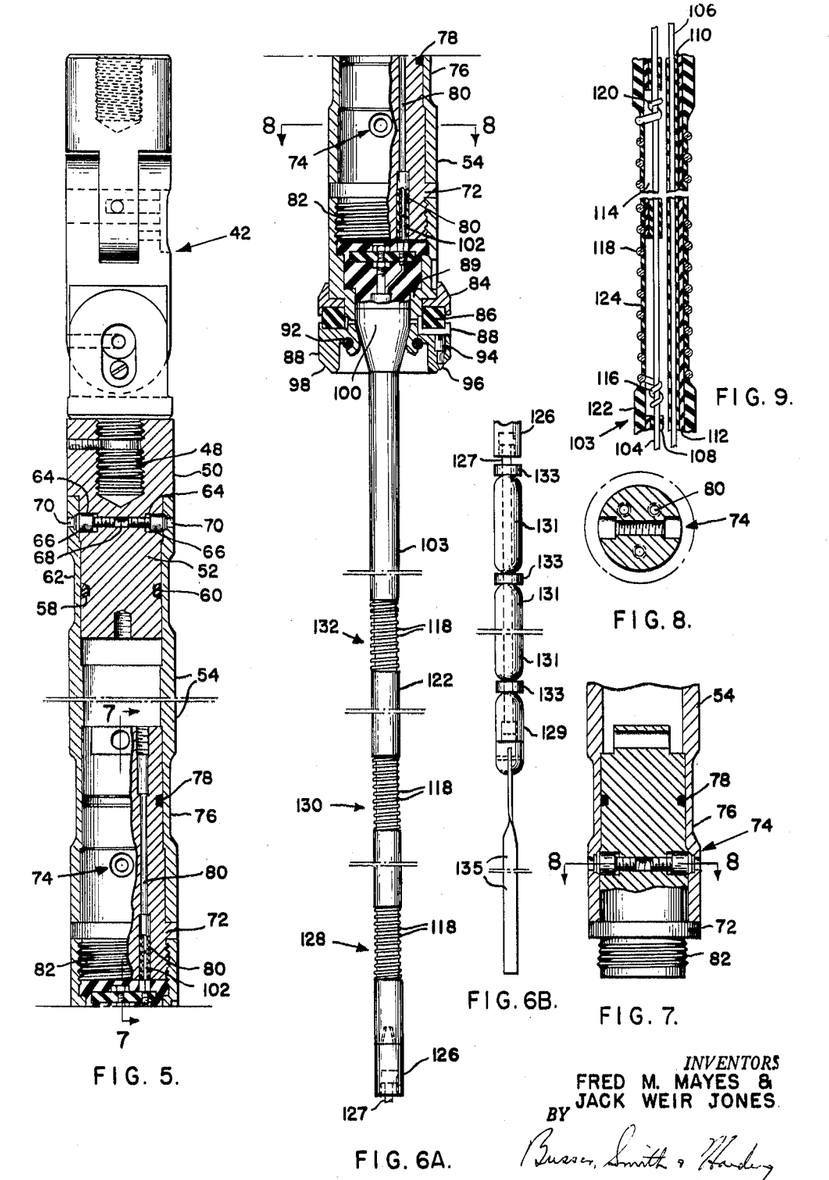
FIGURE 5 is an enlarged section showing certain details of construction of a portion of the apparatus shown in FIGURE 2.
FIGURE 6A is an enlarged vertical section of the lower portion of the apparatus, also showing in elevation the upper portion of a preferred electrode assembly.
FIGURE 6B is a continuation of the electrode assembly shown in FIGURE 6A.
FIGURE 7 is a fragmentary longitudinal section taken on the plane indicated at 7—7 in FIGURE 5 and showing certain details of construction.
FIGURE 8 is a transverse section taken on the plane indicated at 8—8 in FIGURES 6 and 7.
FIGURE 9 is a diagrammatic fragmentary section showing, in particular, the preferred construction of a typical electrode.
Figures 10A, 10B:
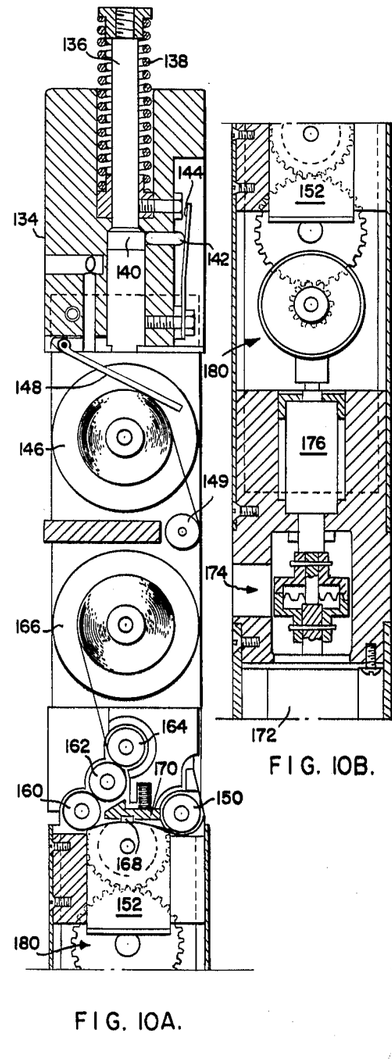
FIGURES 10A and 10B jointly constitute a fragmentary longitudinal section showing the upper portion of a recording assembly, FIGURE 10B providing a continuation of FIGURE 10A.
Figures 11A, 11B:
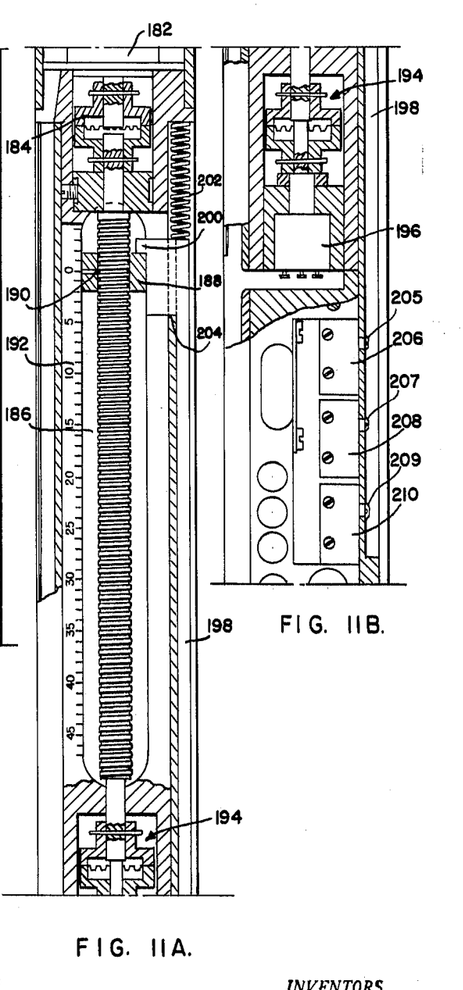
FIGURES 11A and 11B jointly constitute a similar section showing the lower portion of the same assembly, FIGURE 11B providing a continuation of FIGURE 11A.

The electrical ground of the apparatus is the drill stem, which provides an extensive vertical ground. To insure grounding of the apparatus casing, to which the electrical ground connections of the internal apparatus are made, a special assembly is desirable as illustrated in FIGURE 6A. This comprises a pair of rings 84 and 88 which are assembled on the outside of the lower extension 89 of the housing. Between them is a heavy rubber ring 86, the ring 88 being held in position by a split ring 92, but providing for some freedom of upward movement relative to the member 89. Within the ring 88 there are mounted pins 94 of hard conductive material which have pointed ends 96 projecting slightly beyond the conical seating surface 98 of the ring 88. These pins are electrically connected together by a conducting wire which is electrically connected to the member 89. The drill collar is provided with a seat at its lower portion having a conical surface corresponding to the surface 98, and when the apparatus is seated the pointed ends 96 of the pins are forced into the seat to provide the necessary electrical contact, penetrating scale or other resistive material which may accumulate on the seat. The rubber ring 86 is partially extruded under the pressure of the liquid as the instrument reaches seated position, thereby providing a considerable spring force to maintain good contact of the conducting pins. When pumping is stopped the weight of the instrument and the drag shoe friction maintains pressure on the ring 86 to maintain good contact even if there are vertical accelerations which might otherwise break contact by leaving the instrument hanging by the drag shoes 20.

The electrode assembly comprises an adaptor portion 100 within which are mounted pins 102 electrically connected to the electrode leads, the pins being arranged to enter sockets in openings 80 from which leads extend for connection to the recording apparatus. The adaptor 100 is of molded insulated material such as rubber and effectively integral with the sheath of the electrode assembly 103.

As has already been indicated, the electrode assembly is fundamentally a multi-conductor insulated electrical cable on which the electrodes are provided. The construction will be clear from consideration of FIGURE 9. At 104 and 106 are shown a pair of conductors of the cable, it being understood that there may be used any number of conductors corresponding to the number of electrodes or other requirements. The insulation of the first of these conductors is indicated at 108 and of the second at 110, the conductor 104 being hereafter considered as the one connected to the electrode illustrated in FIGURE 9. The external insulation of the cable is indicated at 112, and may, of course, be as usual of multiple layer type. To provide an electrode, the outer insulation 112 is slit as indicated at 114 and the conductor 104 to which the electrode is to be connected is stripped of its insulation through the region of the slit. A conductive wire of suitable material for the electrode configuration desired is then wound about the conductor 104 adjacent to one end of the slit as indicated at 116 and soldered or brazed thereto, being then wound as a helix as at 118 about the exterior of the cable insulation, its end then being wound about and soldered or brazed to the wire 104 at 120. It is desirable to have this dual electrical connection with the conductor within the cable without interrupting the continuity of the conductor so that external accidental breakage of the electrode convolutions will not render part of it useless. Following what has been described, the entire cable is then desirably covered with molded insulation indicated at 122, the assembly being completed by scraping away this last coating as indicated at 124 to expose the convolutions of the electrode helix 118. Using a molded rubber such as that which forms the external covering of the cable, the added thickness at 122 will not detract greatly from the flexibility of the assembly. The helical electrode winding is in itself flexible and protected against wear to a considerable extent by its inclusion within the bounding cylinder of the covering 122.

Any number of electrodes may be thus provided as indicated at 128, 130 and 132 in FIGURE 6, each being connected to an individual conductor of the cable. While many electrode configurations may be used, as will become evident, the following description will for the most part be consistent with the use of three electrodes such as indicated in FIGURE 6 of which the lowermost 128 is the current electrode through which current is introduced into the earth, the next electrode 130 being typically about 16 inches from the first electrode 128 and being known as the short normal electrode, while the third electrode 132 may be typically about 64 inches from the current electrode 128 and is known as the long normal electrode, serving also as the self-potential electrode. These electrodes are quite remote from the lower end of the supporting assembly and adaptor 100. They may, for example, be of the order of 20 feet or more distant from this adaptor and correspondingly distant, during use, from the drill bit shortly above which the protective housing rests during operation. It may be noted that the particular electrode arrangement just indicated is rather arbitrary and that other arrangements may be used. For example, the self-potential electrode may be any of the three shown, or a separate self-potential electrode may be provided. The sequential arrangement is also open to choice.

At the lower end of the electrode assembly there is the weighting arrangement shown particularly in FIGURE 6B. A coupling at 126 supports a flexible wire cable 127 terminating in a stop member 129 there being threaded on the cable 127 a series of lead weights 131 with rounded upper and lower ends with interposition between pair of these weights of flexible washers 133, for example of neoprene. A sufficient number of the weights is used to insure that during lowering the flexible electrode assembly will remain under tension. The arrangement just described provides the necessary flexibility to enable the entire assembly to pass through jet bit openings. At the same time there is provided an arrangement which cannot hang up on tool joints or on shelves in the wall of the hole below the bit. The washers 133 maintain the outside diameter of the weighting assembly to prevent engagement of the depressions between the weights from being arrested by the lower edges of the jet openings during removal of the electrode assembly. A flexible strip 135 of leather or plastic extends from the stop member 129 and facilitates, by its entrainment in the mud flow, the guidance of the electrode assembly into a jet opening in the bit.

If desired, some or all of the metal weights 131 may be used to constitute the lowermost electrode of the assembly through the use of conductive connections thereto; but when the weights are not to be a part of the electrode configuration the cable 127 carrying them may be of insulating material or may have an insulated covering.

The weighted electrode assembly constitutes the subject matter of the patent to Bennett, Chaney and Mayes, Number 3,149,277, dated September 15, 1964, which shows alternative forms of electrode assemblies which may be used. Various aspects of the mechanical arrangement heretofore described form the subject matter of an application of Bennett, Chaney, Jones and Mayes, Serial Number 405,017, filed October 12, 1964, which is in part a continuation of Serial Number 818,162, filed June 4, 1959.

Reference may next be made particularly to FIGURES 10A, 10B, 11A and 11B showing the mechanical arrangement of parts of the current-supplying and recording assembly located within the protective housing constituted by the tube 54 and its plugs 50 and 72.

A frame 134, which need not be described in detail, is formed of an assembly of parts and provides mountings for the mechanical and electrical elements of the recorder. At its upper end it mounts a plunger 136 normally extended outwardly by a spring 138 and, when in such position, locating a cam 140 so as to act upon a pin 142 to open a switch 144 which constitutes a master switch disconnecting the power-supplying battery from the apparatus. When the plunger is pushed inwardly this switch is closed, the inward movement of the plunger taking place as the top plug is inserted into the protective housing.

A magnetic tape supply reel is indicated at 146, and resting on the tape is a spring-urged arm 148 which constitutes a second switch element grounded to the hub of the tape supply reel when the tape is exhausted. The tape from the supply reel 146 passes over a guide roller 149 and about an idler 150 and thence over the curved face of a multiple channel recording head 152. From this it winds about the successive capstan rollers 160, 162 and 164 which are geared together to provide a positive and uniform drive, thence passing to the takeup roller 166. In its passage over the head 152 the tape is pressed thereagainst by a pad 168 carried by a spring-urged lever 170. The capstan rollers are driven by means of gearing indicated at 180 from connections to a battery-powered drive motor indicated at 172. In order to take care of alignment the motor drives through a clutch 174 the shaft of a dual potentiometer 176, to the shaft of which the gearing 180 is connected. It may be here noted that as a result of the drive of the potentiometers at 176 in synchronism with the drive of the tape, the potentiometers at 176 which will be referred to in more detail hereafter, complete single revolutions of their wiping contacts during predetermined advancements of the tape. The recording is thus made independent of maintenance of constant speed of the motor 172.

Figure 14:
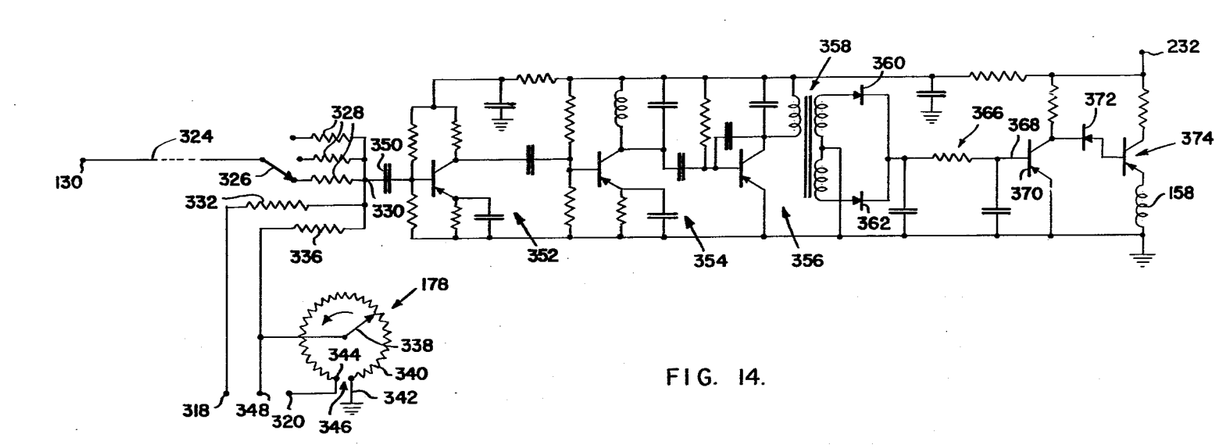
FIGURE 14 is a wiring diagram showing the so-called short normal recording portion of the apparatus.
Figure 16:
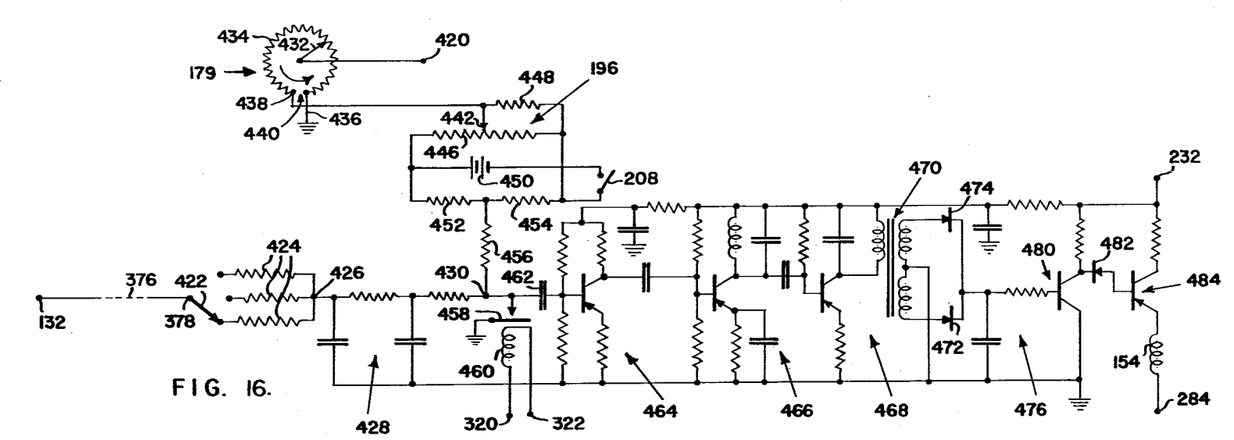
FIGURE 16 is a wiring diagram showing the self-potential recording portion of the apparatus.

The two potentiometers contained in the single housing at 176 are respectively indicated at 178 in FIGURE 14 and at 179 in FIGURE 16.

Another motor 182, which will be referred to as a time delay motor, drives through a clutch 184, provided for alignment, a feed screw 186. A nut 188 is guided to slide longitudinally of this feed screw without rotation and is provided with a spring wire 190 normally engaged with the screw to effect advance of the nut, the wire 190 being manually disengageable to slide the nut to an initial position. A scale 192 which may be conveniently graduated in minutes serves to make possible the positioning of the nut 188 to secure a desired delay in operation as will appear hereafter. An aligning clutch 194 connected to the lower end of the screw serves to drive a potentiometer shown at 196.

A slide 198 is mounted for limited longitudinal movement in the frame and is provided with a step at 200 engageable by the nut 188 as it approaches its zero time position on the scale 192. A spring 202 urges the slide downwardly to a position limited by the stop surface 204. Cam notches 205, 207 and 209 are provided in the slide 198 to effect sequential action of microswitches 206, 208 and 210 as the nut passes beyond its zero position. These notches also restore the microswitches to their original positions after recording is completed.

Portions of the assembly which are not shown in structural detail support the electrical apparatus about to be described, operating batteries, and, if desired, auxiliary equipment which it may be desirable to use but which forms no part of the present invention. One item of auxiliary equipment which is desirably provided is a detector of motion, either longitudinal or rotary, of the drill stem to provide markings on a channel of the tape indicative of initiations or interruptions of logging intervals. Such detectors form the subject matter of the patent to Bennett, Chaney and Mayes, Number 3,131,126, dated July 14, 1964.

Figure 12:
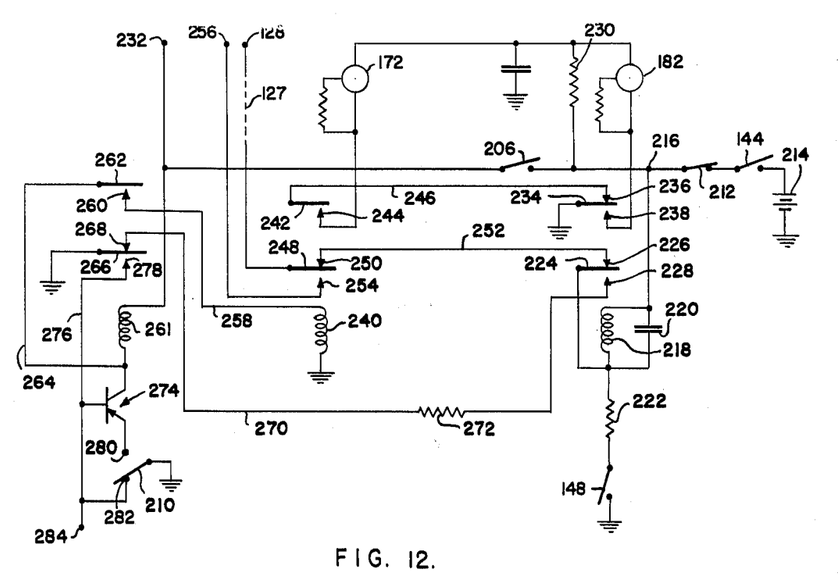
FIGURE 12 is a wiring diagram showing, in particular, an electrical power and control assembly.

It will be convenient to describe the electrical portions of the apparatus as units, with ultimate reference to their interconnections and overall operation. Reference will, accordingly, first be made to FIGURE 12 which shows the electrical power and control assembly.

The main power supply battery 214 has its negative terminal grounded and its positive terminal connected through the series arrangement of switch 144, previously described, and a manually closable switch 212 to a terminal 216. (Switch 212 is not shown in FIGURE 11A but is a limit switch opened by the nut 188 and closed when the nut is adjusted in setting the apparatus for operation.) The terminal 216 is connected to the upper end of the winding 218 of a relay, this winding being shunted by a capacitor 220. Interposed between the lower terminal of this winding and the ground is a resistor 222 in series with the switch 148 which is normally open so long as there is tape on the supply reel 146. The lower end of the winding 218 is also connected to the movable contact 224 of the relay which selectively engages the fixed contacts 226 and 228, the former being engaged when the relay is deenergized. The terminal 216 is connected through resistor 230 to provide current for drive of the time delay motor 182, the return from this motor being to the lower fixed contact 238 engageable by the grounded movable contact 234 of the relay just mentioned, this movable contact being, when the relay is deenergized, in engagement with the upper fixed contact 236. The resistor 230 also supplies current to one terminal of the recorder motor 172. Switch 206 previously mentioned connects the terminal 216 to the terminal 232 which will be found in FIGURES 13 to 17, inclusive, being the supply terminal for positive potential to the transistor devices of those figures. This terminal may also supply current to effect recording by a motion detector provided as previously mentioned.

A second relay has a winding 240, and associated with it are the movable contacts 242 and 248. The former, when the relay is energized, engages the fixed contact 244 which is connected to the other terminal of motor 172, the movable contact 242 being connected at 246 to the fixed contact 236 of the first mentioned relay. The movable contact 248 is connected to the current electrode 128 (FIGURE 6A) through the cable connection indicated at 127. When the relay is deenergized, the movable contact 248 engages the upper fixed contact 250 which is connected at 252 to the fixed contact 226 of the first mentioned relay. The lower fixed contact 254 of the second relay is connected to the terminal 256 which is an output terminal of the oscillator shown in FIGURE 13. The upper terminal of the second relay winding 240 is connected at 258 to a fixed contact 260 engageable by the movable contact 262 of a third relay having a winding 261, the upper terminal of which winding is connected to the positive supply terminal 232. The movable contact 262 is connected at 264 to the lower terminal of this relay winding. A second movable contact 266 of the third relay is grounded and is arranged, when the relay is deenergized, to engage the fixed contact 268 which is connected at 270 through the resistor 272 to the lower fixed contact 228 of the first relay. A transistor 274 has its collector connected to the lower end of the winding 261, its base to the contact 278 through connection 276 and its emitter to the fixed switch contact 280 engageable by the grounded switch arm 210, the latter having been previously referred to. The switch arm 210 alternatively engages the fixed contact 282 which is connected to the transistor base and also to a terminal 284 which appears in FIGURE 16.

Figure 13:
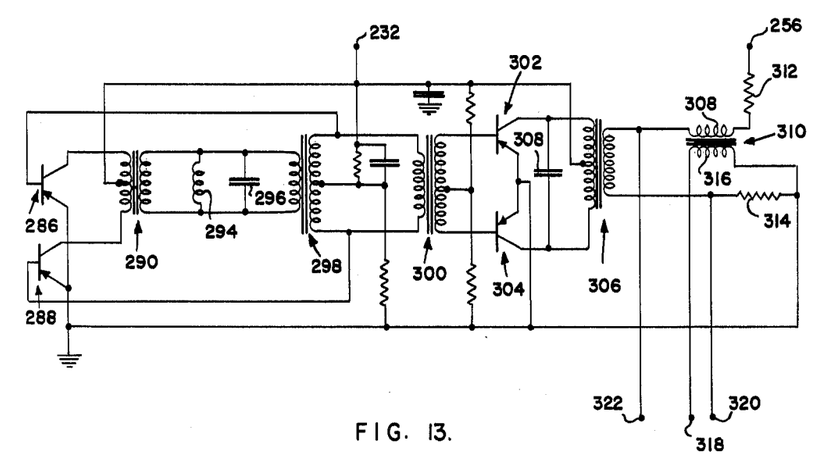
FIGURE 13 is a wiring diagram showing a current-supplying oscillator and its connections.

Referring next to FIGURE 13, there is shown therein the transistorized oscillator which supplies alternating earth current through the current electrode 128 and the drill stem. The frequency of this alternating current may be quite arbitrarily chosen, but it has been found desirable for most logging operations to utilize a frequency of the order of 400 cycles per second. The constants of the circuit are chosen to give a maximum and stable output at such frequency. The oscillator comprises the pair of transistors 286 and 288 located in a conventional oscillator of push-pull type. The output from the transistor is delivered through the transformer 290, the secondary of which is tuned by the inductance 294 and capacitance 296 with output and feedback provided through the transformer 298. Another transformer 300 feeds the amplifier stage including the transistors 302 and 304 delivering an output through transformer 306, the primary of which is tuned by the capacitor 308. On one side of the output connection is provided through the primary 308 of a transformer 310 and through resistor 312 to the terminal 256, previously described which during operation is connected to the current electrode 128. The other side of the output is connected to ground through resistor 314. The secondary 316 of the transformer 310 is grounded at one end and at its other end is connected to the terminal 318 also shown in FIGURE 14. The secondary of transformer 306 supplies output to the terminals 320 and 322. The former of these terminals appears in FIGURES 14, 15, and 16 and the latter in FIGURES 15 and 16.

Reference may be made next to the short normal recorder assembly shown in FIGURE 14.

The short normal recorder is so called in line with common usage in this art in that it responds primarily to resistivity conditions relatively close to the bore hole due to the location of the pickup electrode 130 relatively close to the current electrode. The pickup electrode is connected by one of the cable conductors 324 to the switch 326 which is selectively engageable with contacts joined by resistors 328 of different values to a terminal point 330. This terminal point is connected through adding resistor 332 to the terminal 318 at which a quadrature potential is introduced from the secondary of the transformer 316 in FIGURE 13. The introduction of a quadrature potential at terminal 330 may or may not be required depending upon circumstances of operation, but may be used if necessary to aid in balancing out potentials introduced by mutual induction between the conductors of the electrode assembly. In view of the location of the short normal electrode 130 relatively close to the current electrode, the signals introduced at 130 are relatively large, and this simple arrangement for helping to balance out quadrature signals is sufficient. As will be pointed out later, in the case of the long normal recorder a synchronous system is used for the same purpose since the signals introduced to the long normal recorder are considerably smaller.

Connected also to the terminal 330 through a resistor 336 is the rotary contact or wiper 338 of the potentiometer 178 constituting one of those provided in the dual potentiometer 176 already mentioned. During the logging operation the wiper 338 rotates continuously at a rate which may be quite arbitrary so long as its cycle frequency is small in comparison with the frequency of the current introduced into the earth. This wiper may, for example, make several revolutions per second. The potentiometer resistance at 340 has one of its terminals grounded at 342 and its other terminal 344 connected to the terminal 320 fed from the oscillator of FIGURE 13. A gap 346 exists between the ends of the potentiometer resistance. The various resistances 328, 332 and 336 add the signals received through them to provide an algebraically summed potential at terminal 330, a resistance 328 being chosen in dependence upon the magnitude of signals expected from the electrode 130.

At this point it is desirable to analyze the nature of the signals provided at 330. Considering FIGURE 13, let it be assumed that during a certain half cycle of the oscillator output the upper terminal of the secondary of transformer 306 is positive relative to its lower terminal, and assume that the ground, constituted by the drill pipe is at zero potential. (As will be evident a similar argument holds for a negative half cycle.) Then, due to the resistances at 312 and 314, the terminal 256 which, during operation, is connected to the current electrode 128 is positive, so that at a corresponding time the potential electrode 130 will pick up a positive signal. Under these same conditions the terminal 320 will be negative with respect to ground since current will be flowing toward the left through resistor 314. This terminal 320 is connected to the end 344 of the resistance 340 of potentiometer 178, the other terminal being grounded, so that at any point of the resistance the potential is negative with respect to ground. The wiper 338, accordingly, picks up during its movement along the resistance 340 a signal which is always negative. Accordingly, the inphase signals delivered to terminal 330 are respectively positive from the electrode 130 and negative from the wiper 338. Adjustment of circuit constants is such that the negative potential picked up by the wiper ranges from zero to a potential which in magnitude exceeds that received from electrode 130 and is opposite in sign. Accordingly, during a rotation of the potentiometer wiper a position is reached at which the in-phase potential at terminal 330 passes through zero and changes its phase by 180°. This is the case irrespective of the quadrature potential introduced from terminal 318 if such introduction occurs. The total signal reaches a very low minimum value which may be made substantially zero by proper adjustment of the quadrature compensation.

The signals appearing at terminal 330 are delivered through capacitor 350 to the multistage amplifier constituted by the three stages 352, 354 and 356 of conventional transistor type utilizing pnp transistors. The output of these stages is provided to the transformer 358.

The amplification effected through the transistor stages 352, 354 and 356 is such that except during a quite short interval during which the input at 330 passes through a zero amplitude value the transistor stage 356 is saturated. Accordingly, the transformer 358 receives a wave of substantially constant high magnitude during operation except when the input at 330 passes through zero, the wave merely reversing its phase. The secondary of the transformer 358 feeds the full wave rectifier comprising the rectifying diodes 360 and 362 to provide at 368 through the low pass filter 366 a high positive potential except when the input at 330 passes through zero, the result being a negatively directed pulse relative to a high positive value at that time. The connection 368 is to the base of the transistor 370, and this transistor is conducting except at the time of substantially zero potential at 330. The collector of the transistor 370 is connected to the cathode of the Zener diode 372, the anode of which is connected to the base of the transistor 374, in the emitter circuit of which is the recording coil 158 of one of the channels of the recorder 152. This circuit arrangement is such that the transistor 374 conducts and provides a recording current in the coil 158 only when the transistor 370 is non-conducting. The Zener diode and the transistors associated therewith provide pulse shaping in such fashion as to record a short pulse on the magnetic tape at the time the terminal 330 passes through the zero potential value of magnitude. It may be noted that the circuit arrangement is such that during the passage of the potentiometer wiper 338 across the gap 346 there is a substantial continuity of the saturation condition of the stage 356, due to the electrode potential, so that the recording of a pulse by the winding 158 occurs only under the conditions stated.

Figure 15:
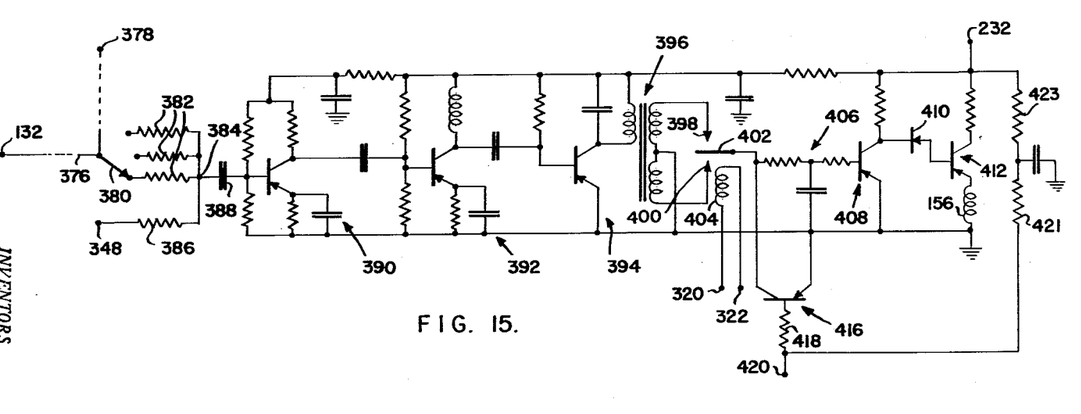
FIGURE 15 is a wiring diagram showing the so-called long normal recording part of the apparatus.

The long normal recorder shown in FIGURE 15 has characteristics generally similar to those of the short normal recorder but certain differences are involved particularly to take into account the smaller signals picked up by the electrode 132 and for certain other purposes which will become hereafter apparent, particularly the recording of a pulse representing zero time for the recording cycle.

The long normal electrode 132 is connected through lead 376 to a switch 380 which corresponds to the switch 326 in FIGURE 14. For correlation purposes there is indicated a connection of this switch to a terminal 378 which appears in FIGURE 16. This connection exists because the electrode 132 is used also for picking up the self potential. The switch 380 serves to connect selectively to the adding resistors 382 which have different values depending upon the magnitudes of the signals expected to be observed. The resistors 382 are connected to the common terminal 384. This terminal is also connected through the adding resistor 386 to the terminal 348 which, as shown in FIGURE 14, is connected to the wiper 338 of potentiometer 178, this same potentiometer serving for comparison purposes in connection with both the short normal and long normal signals. The junction 384 is connected through capacitor 388 to the amplifier comprising the three transistor stages 390, 392 and 394, the last of which delivers its output through the transformer 396.

Up to this point the circuit shown in FIGURE 15 corresponds to that already described and shown in FIGURE 14. However, instead of full wave rectification of the output of the transformer 396 there is provided a synchronous rectification system which is particularly desirable in view of the smaller signals which are picked up by the electrode 132. Since these signals are considerably smaller than those of the short normal recorder the adding resistor 382 must be proportionately smaller than 328 in the short normal recorder input in order to maintain the same scale factor for both resistivity measurements. This smaller adding resistor allows a proportionately larger quadrature signal to be present at 384 than at 330 due to the mutual inductance effect referred to earlier. Synchronous rectification of this signal which contains possibly a large quadrature component, gives the maximum rejection of this component and consequently passes only the signals in proper phase relation with the oscillator. Furthermore, as will immediately become apparent, synchronous rectification gives rise to a simple system for incorporating on the long normal record the indication of zero time for the recording cycle.

The centrally grounded secondary of transformer 396 has its end terminals connected to contact points 398 and 400 of a chopper which has a vibrating contact 402 driven synchronously by the coil 404 which is energized from the terminals 320 and 322 (FIGURE 13). The phasing of the synchronous rectification is so made that operation is effected as later described. The chopper contact 402 is connected through the filter 406 to the base of the transistor 408 which corresponds to the transistor 370 of FIGURE 14. This is followed by the Zener diode connection 410 to the transistor 412 which serves to provide recording current through the coil 156 of a recording head previously mentioned. The diode and transistor arrangement just described is similar to that of FIGURE 14. In operation of the circuit of FIGURE 15 there is involved the transistor 416 having its collector connected to the chopper element 402, its emitter grounded, and its base connected through resistor 418 to a terminal 420 and also through the series arrangement of resistors 421 and 423 to the positive supply terminal 232. It may be noted that the terminal 420 appears also in FIGURE 16, being connected to the wiper 432 of the potentiometer 179 which will have its connections more fully explained in the description of the self potential recording circuit. At the present time it will suffice to point out that, like the potentiometer 178, the potentiometer 179 involves a gap between the grounded end of its resistance 434 and the ungrounded end of that resistance.

The operation of the long normal recording circuit is as follows:

First, let it be assumed that the transistor 416 is absent. Considering a start with the wiper 338 at the position of the grounded terminal 342 of its resistance, and moving counterclockwise as indicated in FIGURE 14, the potential appearing at 384 due to the pick up at electrode 132 will exceed that derived from the potentiometer 178, and the resultant potential will be amplified through the amplifier stages and delivered to the synchronous rectifier. A direct potential will then result at the base of the transistor 408 which, due to proper phasing of the synchronous rectifier will at this time be positive so that the transistor 408 is conducting. It may be noted that in the case of this circuit the saturation of the last amplifier stage is not of particular significance, a sufficiently positive signal being provided to the base of transistor 408 to maintain it conducting even though the picked up signals are relatively weak. So long as transistor 408 is conducting, the transistor 412 is non-conducting and consequently recording current does not pass through the recording head winding 156. As the potentiometer wiper continues to move, the potential introduced from the potentiometer rises until a point is reached where the in-phase component of the potential at 384 becomes zero by reason of the balancing of the signal from electrode 132. As operation passes through this point, the phase of input to the synchronous rectifier is changed through 180°, and the signal delivered to the base of transistor 408 becomes negative. Transistor 408 accordingly becomes non-conducting, and transistor 412 conducts to supply recording current to the winding 156. As further movement of the potentiometer contact continues, the recording signal likewise continues, in contrast with what was described in connection with the circuit of FIGURE 14.

Assuming that transistor 416 was absent, the last described condition would terminate as the potentiometer wiper reached the terminal 344 of its resistance and passed into the gap 346. On entering the gap the earth signal alone would be presented to the terminal 384, and as a consequence a positive signal would be delivered to the base of transistor 408, terminating the recording. It is desirable, however, to present a signal of zero time at the instant that the wiper 432 engages the ground terminal 436 of the potentiometer 179, and for this reason a control is effected by transistor 416 as follows:

Prior to passage of the contact 432 into the gap 440, the potential introduced at terminal 420, considering the resistors 421 and 423 to be of high value, is relatively low in magnitude and immaterial. However, when the wiper or contact 432 enters the gap 440, the potential of terminal 420 rises to the high positive potential of supply terminal 232, rendering the transistor 416 highly conductive. The result is, effectively, grounding of the synchronous rectifier contact 402, so that, even though the signals introduced to this rectifier would otherwise produce a positive potential at the base of transistor 408, the base is actually held substantially at ground potential with the result that the transistor 408 remains non-conducting, and transistor 412 continues to conduct and provide a recording signal. This condition continues until the wiper 432 reaches ground potential, whereupon the transistor 416 is cut off, and the transistor 408 immediately becomes conducting since, at this same time, a positive signal is the response of the synchronous rectifier to the earth signals at electrode 132.

Summarizing the foregoing, the signal recorded by the head 156 starts with the balancing of the in-phase component of the potential at 384 at a zero value and continues until the wiper 432 reaches its ground contact at 436, the latter time representing the zero reference time for the cycle. The long normal record, accordingly, consists of a series of "dashes" while the short normal signal consists of very short pulse "dots." As will shortly appear, the self potential record also consists of short "dots." Three channels on the tape accordingly provide four items of information, making unnecessary the use of a separate timing channel. This is of importance in view of the limited space available which conveniently accommodates only four channels, a fourth channel being thus available for the recording of drill stem movements through the use of motion-responsive means previously referred to.

Referring to FIGURE 16, the electrode 132 (or a separate electrode, if desired) is connected at 376 to the selecting switch 422 which may be used to introduce a suitable summing resistor 424 into the circuit. The common terminal of these resistors shown at 426 is connected to the low pass filter 428 which provides a direct current input at the junction 430, the filter being primarily designed to eliminate the alternating logging frequency. As in the case of the other recorders, the circuit provides for balancing at the terminal 430 the input signal. The balancing circuit involves the connection between terminal 420 and the positive supply terminal 232 through the resistors 421 and 423, the terminal 420 being connected to the rotating wiper of the potentiometer 179, the resistance 434 of which has one terminal grounded at 436 and the other terminal 438 connected to a balancing network. A gap 440 exists between the terminals 438 and 436. As previously noted, the potentiometer 179 is arranged to rotate in unison with the potentiometer 178, and ground contacts are simultaneously made. In view of the type of operation which is desired and which has been described to secure the zero cycle indication, the wiper 432 desirably leaves the terminal 438 at the latest before the wiper 338 leaves the terminal 344.

The network comprises the balancing potentiometer 196, previously referred to, having the adjustable contact 442 engaging the resistance 446. While not so shown in the wiring diagram, this potentiometer is also of the rotary type, being motor driven. A battery 450 is connectable across the resistance 446 by the switch 208, and wiper 442 is connected to one end of the potentiometer resistance through a resistor 448. A pair of equal resistors 452 and 454 bridge the potentiometer resistance and are connected at their junction to each other through the resistor 456 to the terminal 430.

The automatic adjustment of the potentiometer 196 will be discussed hereafter. During operation in logging the adjustment remains constant. The rotation of the wiper 432 provides a variation of input potential to the terminal 430 which, for measuring, is caused to balance the earth potential to provide a zero input to the recorder amplifier.

In order to secure effective amplification, the direct signal at 430 is desirably chopped by means of the chopper contact 458 which is vibrated by the winding 460 energized from the terminals 320 and 322. Input to the amplifier is provided through capacitor 462, there being provided the three transistor amplification stages 464, 466 and 468, the output being fed through transformer 470 to the full wave rectifier comprising the diodes 472 and 474, followed by the filter 476 which provides its output to the base of the transistor 480. This is connected through the Zener diode 482 to the transistor 484 which controls the recording current through the head winding 154. In this circuit the return of the winding 154 is not to ground but to the terminal 284 shown in FIGURE 12. As will be evident from comparison of FIGURES 14 and 16, the amplifiers are substantially the same in the short normal and self potential recording systems. The operation is also substantially the same, a short pulse "dot" being recorded when the input at the terminal 430 is zero.

Figure 17:
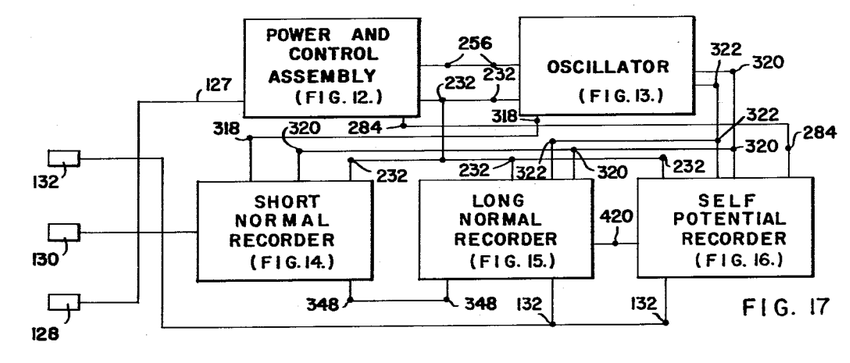
FIGURE 17 is a diagram provided to make clear the interconnections of the various wiring diagrams constituting FIGURES 12 to 16, inclusive.

The various interconnections of the several assemblies are shown in FIGURE 17 which will make clear their interactions.

In the apparatus disclosed the saving of battery power is important, and consequently it is desirable to draw power only when the apparatus is ready to function. Together with the aspect of self potential adjustment, this requires a fairly elaborate control system which has been described with reference to FIGURE 12. The overall operation of the apparatus will now be described.

Preliminary assembly at the surface requires that the magnetic tape be in condition to feed, and this involves an open condition of the switch 148. The potentiometer wiper 432 is set in mid position in preparation for the automatic adjustment of the potentiometer 196. The nut 188 is set in position on the feed screw 186, utilizing the timing scale 192, the adjustment being such as to initiate the recording operation only after a time interval, following initial triggering, sufficient to insure the location of the apparatus in position to start logging, i.e., with the instrument at the bottom of the drill stem and with the electrode assembly extending below the bit through a jet opening. The setting of the nut 188 will automatically effect closure of switch 212, but initially this has no effect in starting operation. The operating assembly is then placed in the protective casing provided by the tube 54. Closure of this tube pushes plunger 136 inwardly, closing switch 144. In this condition, the apparatus may be set aside, desirably with some insulating covering over the current electrode to avoid accidental grounding, since the grounding of this electrode initiates operation.

With the drill stem lifted from the bottom of the hole to provide a space for extension of the electrode assembly below the bit, the assembly is ready for lowering. Just prior to this, the operating apparatus may be started by grounding the current electrode, but, if desired, initiation of operation may be effected only when the current electrode encounters mud and is thus grounded.

As already indicated the apparatus may be dropped in go-devil fashion, may be lowered on a wire line, or may be pumped down through the drill stem. Its descent through the drill stem is retarded or caused to be approximately at the rate of downflow of mud by reason of the action of the parachutes 10 and 34, and when it enters the drill collar further retardation of descent is effected by the frictional action of the members 20. Ultimately, the electrode assembly will enter and feed through a jet opening in the bit, with the apparatus finally coming to rest with the electrode assembly fully extended and with a ground connection made at the bottom of the drill stem as already fully described.

The operations of the controlling apparatus are as follows:

The grounding of the current electrode 128 energizes the relay 218 through the connections 127, 248, 250, 252, 226 and 224, grounding the lower terminal of the relay winding. At this time note of the time is made and a time log is thereafter kept, recording the particular times when lengths of drill stem are disconnected and removed during the logging operation. Correlation of time at the surface with the original setting of the nut 188 will indicate to an operator when the apparatus is ready to start logging. The relay 218 is self locked by the engagement of movable contact 224 with fixed contact 228 which completes a grounding circuit through resistance 272 and through contacts 268 and 266. The current electrode circuit is simultaneously opened at 226. Engagement of contacts 234 and 238 completes to ground the circuit of the timing motor 182 which starts the drive of the screw 186 and of the potentiometer 196. Operations of the latter are at this time idle ones.

The next event which occurs after the timing interval which has been preset is the closure of switch 206. This connects the positive terminal of the battery 214 to the main supply terminal 232 of the various transistor circuits. While all of the amplifier circuits are thus energized, it may be noted that only the self potential amplifier is now receiving signals since the output from the oscillator is at this time disconnected from the current electrode.

Additionally, the closure of switch 206 provides current supply to the upper terminal of the relay winding 261. No action occurs at this time since the switch 210 is in the position illustrated, opening the emitter circuit of the transistor 274.

The next occurrence is the closure of switch 208 to connect the battery 450 across the potentiometer 196.

The potentiometer 196 is now being rotated through complete cycles once in approximately thirty seconds. The next operation which occurs is the shifting of switch 210 to engage the terminal 280 and thus ground the emitter of transistor 274. The transistor is now ready to respond to a signal through terminal 284. Such a signal is emitted from the self potential recording circuit of FIGURE 16 when a null balance occurs at the junction 430.

The occurrence of the signal at 284 effects the following operations:

Relay 261 is energized and locked by contact 262 with 260 in series with the relay 240 which is simultaneously energized. Contacts 266 and 278 ground the base of transistor 274 and also the terminal 284 which is at the lower end of recording head coil 154. Thus, this coil is put into the same electrical condition as the coils of the other recording circuits.

The opening of engagement between contacts 266 and 268 deenergizes the relay 218. The release of contact 234 stops the timing motor 182 leaving the adjustable potentiometer 196 in its set position. At the same time, contacts 234 and 236 engage and 242 and 244 are closed to start the recording motor 172. Energization of relay 240 also connects the current electrode 128 to the oscillator output terminal 256 by engaging contacts 248 and 254. The current electrode is simultaneously disconnected from the lower terminal of relay coil 218 by reason of the opening, at 250 of its engagement with contact 248, even though the contacts 224 and 226 remain closed.

All of the elements of the apparatus are now in condition for logging, and recording is accomplished as has been described above in connection with the individual recording circuits. The records which are produced may be correlated with the time records of cessation of drill stem movements by reason of the fact that in reproduction the cessations of such movements will be indicated by records involving no changes of picked up potentials over intervals corresponding to rest conditions of the drill stem. Logging will generally be carried out by raising the drill stem, section by section, though, of course, a checking log may be provided by thereafter again lowering the drill stem. Reproduction of the record may be effected as described in our prior, Patent Number 3,065,404, dated November 20, 1962. The time reference zero signals may of course, be identified on the long normal record by taking into account their occurrence at the ends of the successive recording cycles.

Reference may now be made to the matter of adjustment of the potentiometer 196. The reason for this is that the self potential signals may vary from the standpoint of being informative about an unpredictable more or less fixed potential level, the level being possibly due to electrochemical potentials which may exist in the configuration being logged. If the complete potential had to be recorded to be certain that parts of the record would not be off scale, it might well happen that the variations of potential actually of interest might be a relatively small fraction of the total potential picked up. In other words, to get certanty of results it might well be necessary to have full scale of recording correspond to an unnecessarily large range. For this reason it is desirable to balance out at least approximately the average value of the picked up potential in the vicinity of logging, whereupon it becomes possible to spread the information of value through a longer range of the recording, i.e., the signals may be, in effect, magnified. By holding fixed the position of potentiometer 179, while cyclically varying the potentiometer 196, it is possible to set, by stopping its cycling, the potentiometer 196 at such a value as to balance out to a considerable extent the background potential level, so that thereafter, during recording, the variations produced in the record by the potentials of interest will lie more or less about the level of the background potential. Considering FIGURE 16, it will be evident that the setting of potentiometer 196 in conjunction with the battery 450 results in the provision of a fixed potential which, in a sense, is algebraically substracted from the detected potential to eliminate to a considerable extent the background component of the potential which will ordinarily remain reasonably constant throughout a considerable length of the bore hole.

For the purpose of saving battery power, it is desirable to open the electrical circuits when the logging is completed and prior to the usually extended period of removal of the apparatus from a hole. To do this, advantage is taken of the fact that the exhaustion of the magnetic tape may interrupt the current flow.

When the tape is exhausted grounding is effected through closure of the switch at 148 to energize the relay 218 which, theretofore, during the recording, was deenergized. Energization of relay 218 starts the timing motor, through engagement of contacts 234 and 238, thereby driving the lead screw and causing the cams acting on the various microswitches to restore them to their original positions. As will be evident without detailed discussion this deenergizes the various recording circuits, stopping the recording motor as well. The limit switch 212 upon being opened as the nut 188 reaches its extreme position will stop the motor and also deenergize the relay 218. Thus, shortly after the exhaustion of the magnetic tape the entire apparatus is closed down.

The correlation of the records with the depths at which they are produced may be carried out in various fashions. Theoretically simple but not too practical is a system in which either the motor 176 is accurately controlled as to speed (so that the zeros of the recording cycles occur at regular intervals) or in which timing marks are produced on the recording tape at clock controlled equal intervals. The former of these systems requires rather elaborate electrical controls when batteries are used as power sources because of isolation of the apparatus from a surface, fixed frequency, alternating current supply. The latter requires a clock synchronized with a surface clock. In both systems elaborate records are necessary at the surface giving a record of depth against time.

It is simpler to permit the tape to advance at a speed corresponding to that of the motor which, though desirably designed for reasonably constant speed despite drain on the driving battery as logging proceeds, may have a speed substantially variable over a long period of time. Using a well built and sufficiently powerful motor, it is found justifiable to assume a constant speed throughout any period of drill stem movement between stoppages for removal of drill stem sections. Furthermore, measurements have shown that it is possible to assume validity that the rate of movement of a drill stem during lifting (or lowering) periods is constant. Accordingly, it is possible to use only the logging records above described to correlate the records with depth since absences of changes of the records define those portions made during fixed vertical positions of the drill stem occurring as sections are removed or added. Accordingly by keeping records at the surface of depths corresponding to cessations of vertical movement of the drill stem and by making the assumption of substantially constant speed of tape advance throughout individual vertical movement periods and of uniform lifting or lowering movements (these assumptions permitting interpolation) complete correlations of records with depth may be secured. Doubts which may sometimes exist as to the precise points on records at which vertical movements began or ended, for example because of variations in the records due to disturbances of the electrodes caused by mud flow, may generally be resolved by quite valid assumptions that the tape speed was substantially constant throughout several successive periods of vertical movement.

However, it is desirable to provide independent records on the tape of drill stem motions, rotary or vertical, in accordance with the disclosure of Patent 3,141,126, referred to above.

It will be evident that various details of construction and operation may be modified without departing from the invention as defined in the following claims.

What is claimed is:

1. Apparatus comprising means providing a first direct potential having a predetermined relationship to a quantity which is to be recorded, means providing a second direct potential having a magnitude varying cyclically at a low rate, means adding said potentials in opposition to produce a resultant signal having a magnitude which passes repeatedly through a substantially zero value, and means recording the time of occurrence of a substantially zero value of said resultant signal, said recording means including a chopper for said resultant signal giving rise to an alternating signal, means for rectifying said alternating signal to provide an output, and means recording the time of occurrence of a substantially zero value of said output.

2. Apparatus for the logging of bore holes comprising means providing an exciting current to the earth in the vicinity of the apparatus, means providing a first potential which is a function of a response of the system to said exciting current, which response is derived from the earth in the vicinity of the logging apparatus and is to be recorded, means providing a second cyclically varying potential having during each cycle a predetermined waveform proportional in amplitude to said exciting current, means sensitive to a predetermined relationship during each cycle between said first and second potentials, and means controlled by said sensitive means for recording the phase relationship of said predetermined relationship occurring in each cycle to a cycle of said second potential in the form of a pulse time modulated linear record.

3. Bore hole logging apparatus comprising a housing adapted to be moved lengthwise of a bore hole, electrode means secured to said housing to be moved therewith, and means within the housing to record direct potential variations of said electrode, the last mentioned means including means responsive to a direct potential of said electrode and automatically operative to provide an adjusted potential opposed to a predetermined value of the electrode potential, means for recording the variations of the resultant difference of the potential of said electrode and said adjusted potential, and means for effecting in sequence, first, operation of said means providing an adjusted potential and, second, operation of the last mentioned recording means after the adjusted potential is established, said means for recording the variations of the resultant difference of the potential of said electrode and said adjusted potential comprising means providing a cyclically varying potential, means sensitive to a predetermined relationship between the last mentioned potential and said resultant potential difference, and means recording the phase relationship of said predetermined relationship to a cycle of said cyclically varying potential.

References Cited by the Examiner
UNITED STATES PATENTS

| | | | |
|---|---|---|---|
| 2,070,912 | 2/1937 | McDermott. | |
| 2,300,823 | 11/1942 | Whitman. | |
| 2,349,366 | 5/1944 | Moon | 175—41 |
| 2,382,609 | 8/1945 | Dale | 346—33 |
| 2,623,805 | 12/1952 | Sewell | 324—1 X |
| 2,653,294 | 9/1953 | McMillan | 324—10 |
| 2,681,567 | 6/1954 | Widess | 324—1 X |
| 2,759,143 | 8/1956 | Arps | 324—1 |
| 2,771,596 | 11/1956 | Bellamy | 340—347 |
| 2,822,520 | 2/1958 | Cattermole | 332—9 |
| 2,835,883 | 5/1958 | Lichtman et al. | 340—203 |
| 2,841,778 | 7/1958 | Ball et al. | 324—1 X |
| 2,862,165 | 11/1958 | Younkin | 332—9 |
| 2,870,412 | 1/1959 | Hern | 332—9 |
| 2,879,126 | 5/1959 | James | 346—33 |
| 2,913,675 | 11/1959 | Curtis | 332—9 |
| 2,936,447 | 5/1960 | Kinkead et al. | 340—347 |
| 2,941,196 | 6/1960 | Raynsford et al. | 340—347 |

WALTER L. CARLSON, *Primary Examiner.*
SAMUEL BERNSTEIN, FREDERICK M. STRADER,
*Examiners.*